US010487899B2

United States Patent
Nelson

(10) Patent No.: US 10,487,899 B2
(45) Date of Patent: Nov. 26, 2019

(54) CANTED COIL SPRING SHOCK ABSORBER

(71) Applicant: Nelson Products, Inc., Golden, CO (US)

(72) Inventor: Carl Nelson, Golden, CO (US)

(73) Assignee: NELSON PRODUCTS, INC., Golden, CO (US)

( * ) Notice: Subject to any disclaimer, the term of this patent is extended or adjusted under 35 U.S.C. 154(b) by 175 days.

(21) Appl. No.: 15/046,386

(22) Filed: Feb. 17, 2016

(65) Prior Publication Data
US 2017/0234391 A1   Aug. 17, 2017

(51) Int. Cl.
| *F16F 1/04* | (2006.01) |
| *F16F 3/04* | (2006.01) |
| *A43B 13/18* | (2006.01) |
| *A43B 21/26* | (2006.01) |
| *A43B 21/30* | (2006.01) |

(52) U.S. Cl.
CPC ............ *F16F 1/045* (2013.01); *A43B 13/182* (2013.01); *A43B 13/186* (2013.01); *A43B 21/26* (2013.01); *A43B 21/30* (2013.01); *F16F 3/04* (2013.01)

(58) Field of Classification Search
CPC ........... F16F 1/045; F16F 3/04; A43B 13/182; A43B 13/186
See application file for complete search history.

(56) References Cited

U.S. PATENT DOCUMENTS

| 3,468,527 | A |   | 9/1969  | Mather   |                      |
|-----------|---|---|---------|----------|----------------------|
| 4,655,462 | A | * | 4/1987  | Balsells | ........... F16J 15/3212 |
|           |   |   |         |          | 267/1.5              |
| 4,826,144 | A |   | 5/1989  | Balsells |                      |
| 4,830,344 | A | * | 5/1989  | Balsells | ........... F16F 1/045 |
|           |   |   |         |          | 267/1.5              |
| 4,876,781 | A |   | 10/1989 | Balsells |                      |
| 4,893,795 | A |   | 1/1990  | Balsells |                      |
| 4,907,788 | A |   | 3/1990  | Balsells |                      |
| 4,915,366 | A |   | 4/1990  | Balsells |                      |
| 4,961,253 | A | * | 10/1990 | Balsells | ........... F16F 1/04 |
|           |   |   |         |          | 29/896.9             |
| 4,964,204 | A |   | 10/1990 | Balsells |                      |
| 4,974,821 | A | * | 12/1990 | Balsells | ........... F16F 1/04 |
|           |   |   |         |          | 267/1.5              |
| 5,108,078 | A | * | 4/1992  | Balsells | ........... F16F 1/04 |
|           |   |   |         |          | 267/1.5              |

(Continued)

FOREIGN PATENT DOCUMENTS

| EP | 0469489 B1 | 5/1995 |
| EP | 0491258 B1 | 4/1996 |
| EP | 0890758 A2 | 1/1999 |

OTHER PUBLICATIONS http://www.adidas.com/us/men-springblade-running-shoes, © 2015 adidas America Inc., Men Springblade Running Shoes; downloaded on Oct. 1, 2015.

(Continued)

*Primary Examiner* — Vishal R Sahni
(74) *Attorney, Agent, or Firm* — Fish IP Law, LLP

(57) ABSTRACT

A shock absorbing device having at least one canted spring disposed between two members is described. When the members move toward each other, the one or more canted coil springs are canted and compressed. The shock absorbing device takes advantage of the unique force-displacement curve of canted springs and reduces bounce back.

21 Claims, 14 Drawing Sheets

(56) References Cited

U.S. PATENT DOCUMENTS

| | | |
|---|---|---|
| 5,139,243 A | 8/1992 | Balsells |
| 5,139,276 A | 8/1992 | Balsells |
| 5,160,122 A | 11/1992 | Balsells |
| 5,203,849 A | 4/1993 | Balsells |
| 5,239,737 A | 8/1993 | Balsells |
| 5,358,224 A * | 10/1994 | Balsells .................. F16F 1/04 |
| | | 267/167 |
| 5,503,375 A | 4/1996 | Balsells |
| 5,615,870 A | 4/1997 | Balsells |
| 5,709,371 A | 1/1998 | Balsells |
| 5,791,638 A | 8/1998 | Balsells |
| 7,055,812 B2 | 6/2006 | Balsells |
| 9,010,740 B2 | 4/2015 | Jaster |
| 2011/0263164 A1* | 10/2011 | Lenhert .................. F16F 1/045 |
| | | 439/816 |
| 2012/0098179 A1* | 4/2012 | Jaster ...................... F16F 1/045 |
| | | 267/166 |
| 2016/0076568 A1* | 3/2016 | Dilmaghanian ... H01R 13/2421 |
| | | 403/271 |

OTHER PUBLICATIONS http://www.zcoil.com/products/, The Full Z-Coil Pain Relief Footwear Line, downloaded on Oct. 1, 2015.

http://spira.com/wavespring-technology, Spira Wavespring Technology, © 2015—Spira Footwear, downloaded on Oct. 1, 2015.

\* cited by examiner

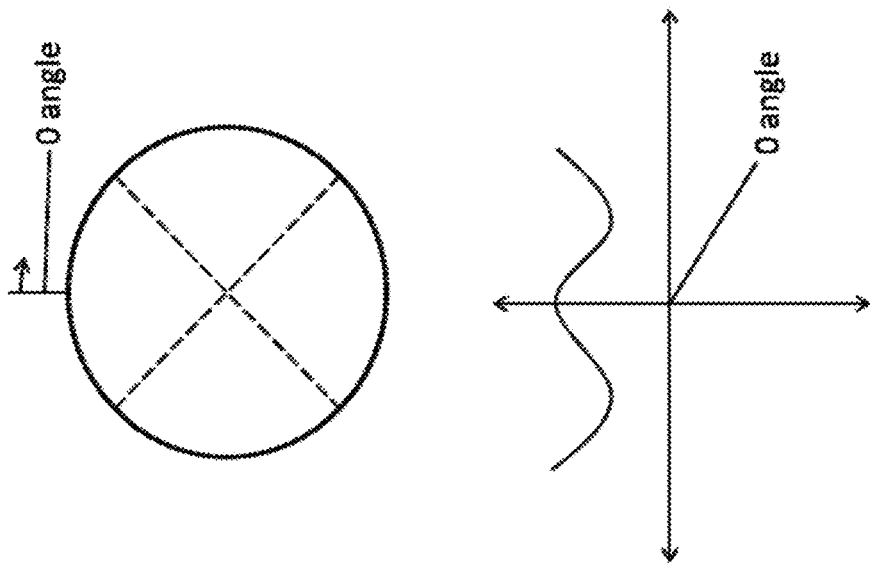

CANTED COIL SPRING SHOCK ABSORBER

FIELD OF THE INVENTION

The field of the invention is shock absorption devices and methods.

BACKGROUND

The background description includes information that may be useful in understanding the present invention. It is not an admission that any of the information provided herein is prior art or relevant to the presently claimed invention, or that any publication specifically or implicitly referenced is prior art.

Some shock absorbing devices are known in the art, especially shock absorbing devices used in shoes. For example, Adidas makes a shoe called the Springblade™ Drive M Running shoe. That shoe is made up of a plurality of cantilevered beam springs. As another example, Z-Coil makes a spring-loaded shoe that has coil springs disposed in the heel portion of the shoe. Yet another example is the company Spira has created a shoe using what it calls WaveSpring® technology. Spira shoes often have one spring disposed in the heel portion of the shoe and two other springs disposed in the forefoot portion of the shoe.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

While the prior art devices provide some advantages for absorbing shock, the prior art fails to provide a shock absorption configuration that utilizes the unique load-deflection characteristics of a canted coil spring. For a description of the load-deflection characteristics of canted coil springs, see U.S. Pat. Nos. 3,468,527, 4,876,781, 4,893,795, 4,974,821, EP0469489, EP0491258, EP0890758.

Thus, there is still a need for improved shock absorption devices and methods.

BRIEF DESCRIPTION OF THE DRAWING

FIG. 1B is a cross sectional view of a canted coil spring having two axes of compressibility with an accompanying force versus angle graph for a given constant displacement.

DETAILED DESCRIPTION

The following description includes information that may be useful in understanding the present invention. It is not an admission that any of the information provided herein is prior art or relevant to the presently claimed invention, or that any publication specifically or implicitly referenced is prior art.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. In one aspect of the inventive subject matter, the inventors contemplate a shock absorbing device having three key components: two members and at least one canted coil spring. The two members are movably coupled to one another and preferably formed into generally flat pieces with at least one, but sometimes two or more, canted coil spring disposed between them. When the members are moved toward each other by application of force, pressure, or displacement, the one or more canted coil spring compresses along one or more axes of compressibility unique to those springs.

A canted coil spring, sometimes called a slanted coil spring, is a coiled spring formed such that the coils are all slanted at an angle (see, e.g., U.S. Pat. No. 5,108,078 describing some types of canted coil spring configured into circular shapes). Canted coil springs are unique in that the springs respond to deflection by exhibiting a near-flat force curve, similar to the spring response of a shape memory alloy. This unique response enables canted coil springs to be used in many different applications where an ordinary spring that exhibits a linear force-respond to deflection would not be adequate.

The axis of compressibility describes a radial axis of a canted coil spring along which compression is intended to occur based on the design of the spring. In springs having a single axis of compressibility, if compression force required to cause a particular deflection in the spring is graphed as a function of angle rotated about the longitudinal axis of the canted coil spring, an angle of zero would result in a minimum on the graph. In springs having multiple axes of compressibility, on the other hand, if compression force required to cause a particular deflection in the spring is graphed as a function of angle rotated about the longitudinal axis of the canted coil spring, each time an angle coincides with an axis of compressibility, a local minimum would appear in the graph. In all of the embodiments of the shock absorber described in this application, compression in the canted coil spring occurred at least in part along the axis of compressibility.

Figure 1A:
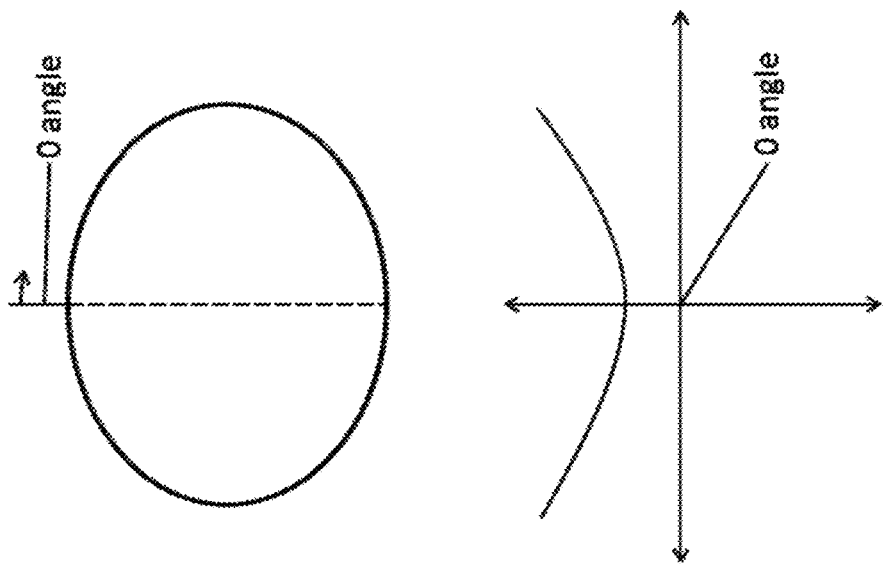
FIG. 1A is a cross sectional view of a canted coil spring having a single axis of compressibility with an accompanying force versus angle graph for a given constant displacement.

FIG. 1A shows a cross-section of a spring 100A having a single axis of compressibility with an associated graph showing the force required to achieve a constant deflection as a function of angle as measured from the 0 angle, while FIG. 1B shows a cross-section of a spring 100B having multiple axes of compressibility with an associated graph showing the force required to achieve a constant deflection as a function of angle as measured from the 0 angle. On each of the graphs shown in FIGS. 1A and 1B, the minimum/local minima correspond to compression directly along an axis of compressibility.

Figure 2:
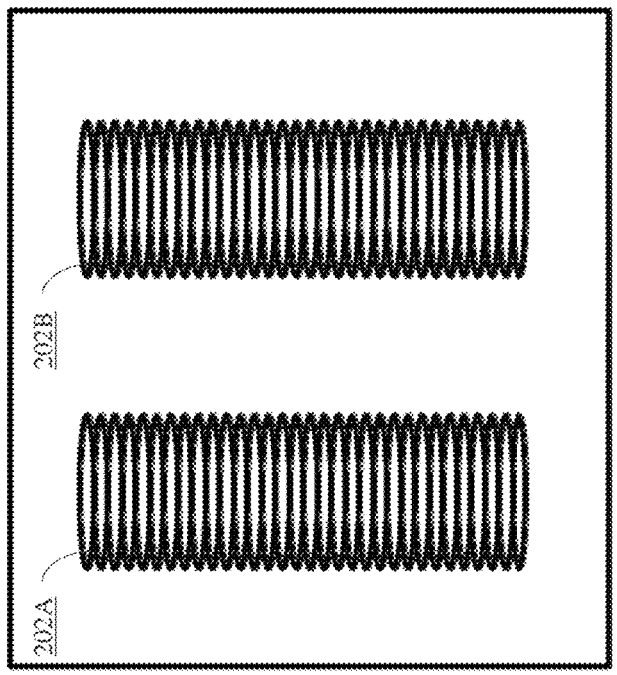
FIG. 2 is a top plan view of two canted coil springs disposed on a substrate.
Figure 5:
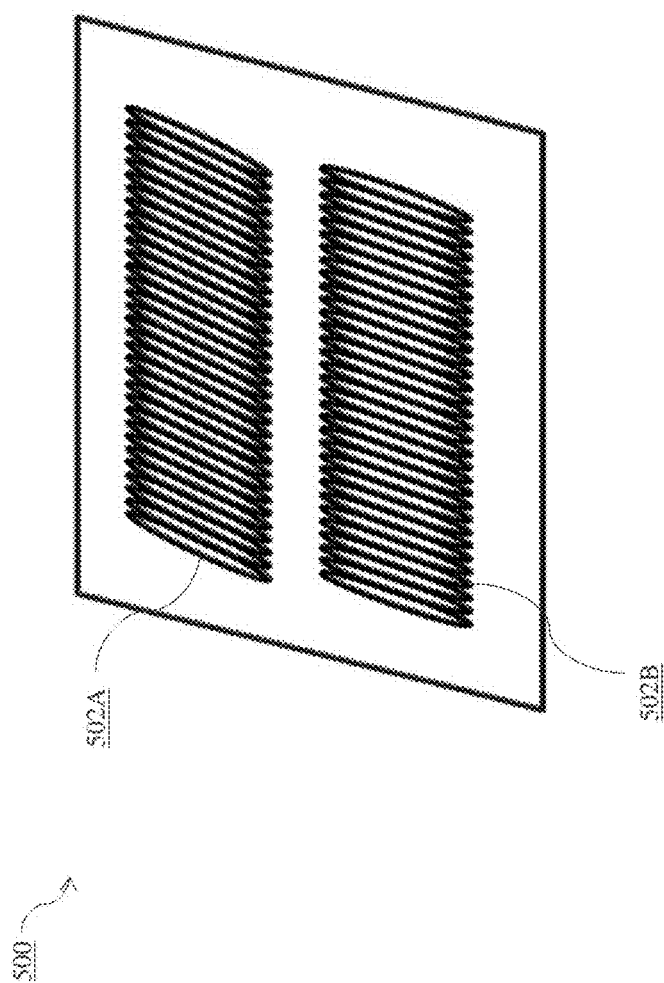
FIG. 5 is a perspective view of a member having two canted coil springs that are angled in the same direction.

As mentioned briefly above, the members can be formed into opposing plates, or plate-like structures having one or more canted coil springs disposed between them (sometimes referred to as "members"). In some embodiments the canted coil springs are both linearly configured and positioned between the plates such that they are parallel to one another. FIG. 2 shows a top view 200 of two springs 202A and 202B resting in such a configuration. When looking at FIG. 2, the coils of both springs 202A and 202B could be slanted so that the tops of both springs (assuming the view in FIG. 2 is a top view) are slanted either upward or downward. For example, FIG. 5 shows a perspective view of a configuration 500 where the springs 502A and 502B are slanted in the same direction. In some embodiments, the springs 502A and 502B should be disposed symmetrically to one another according to a line of symmetric between the two. In other embodiments, the springs 502A and 502B can be disposed symmetrically to one another according to a line of symmetry that also divides the members symmetrically.

Figure 4:
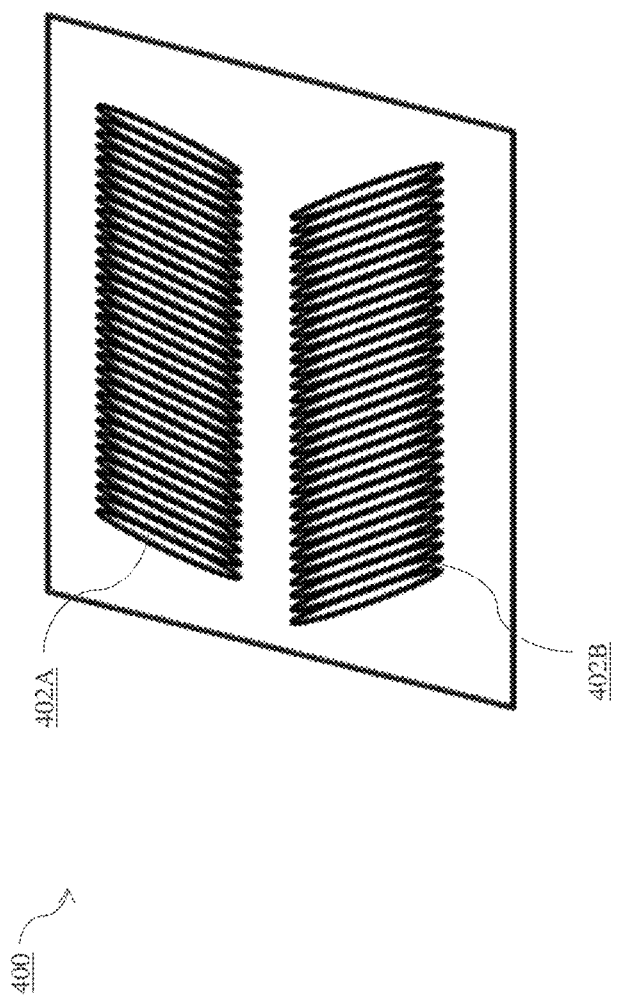
FIG. 4 is a perspective view of a member having two canted coil springs that are angled in opposite directions.

In still further embodiments having at least two canted coil springs disposed between the plates, the canted coil springs are positioned and oriented between the plates such that their coils are slanted in opposite directions. FIG. 4 shows a perspective view 400 of two canted coil springs 402A and 402B that are slanted in opposite directions.

Figure 3:
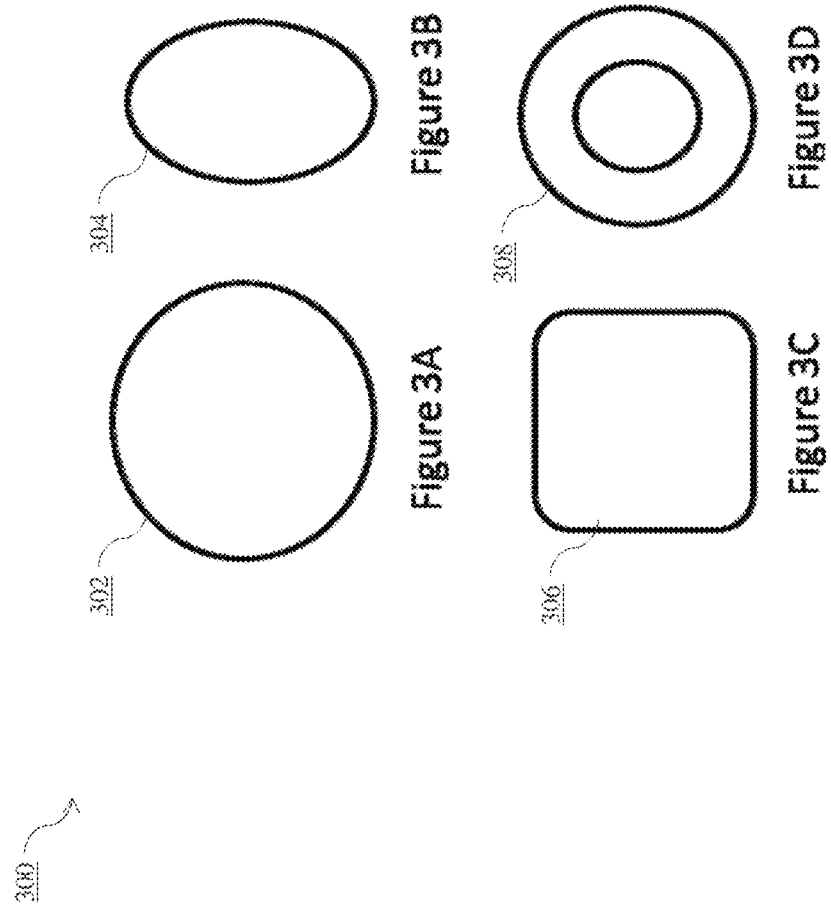
FIGS. 3A-3D is a top plan view showing different configurations for canted coil springs.

Although in some embodiments, as mentioned above, the canted coil spring can be linearly configured (as seen in FIG. 2), in other embodiments, the canted coil spring can be configured such that it is joined at the ends (e.g., forming a loop or another circuit such as an oval, a square, a rectangle, etc.). Some possible axial canted coil spring configurations 300 are shown in FIGS. 3A-3D. FIG. 3A shows a circular configuration 302, FIG. 3B shows an oval configuration 304, FIG. 3C shows a rounded square configuration 306, and FIG. 3D shows a concentric configuration 308, wherein one spring is oriented concentrically to a second spring.

Figure 6:
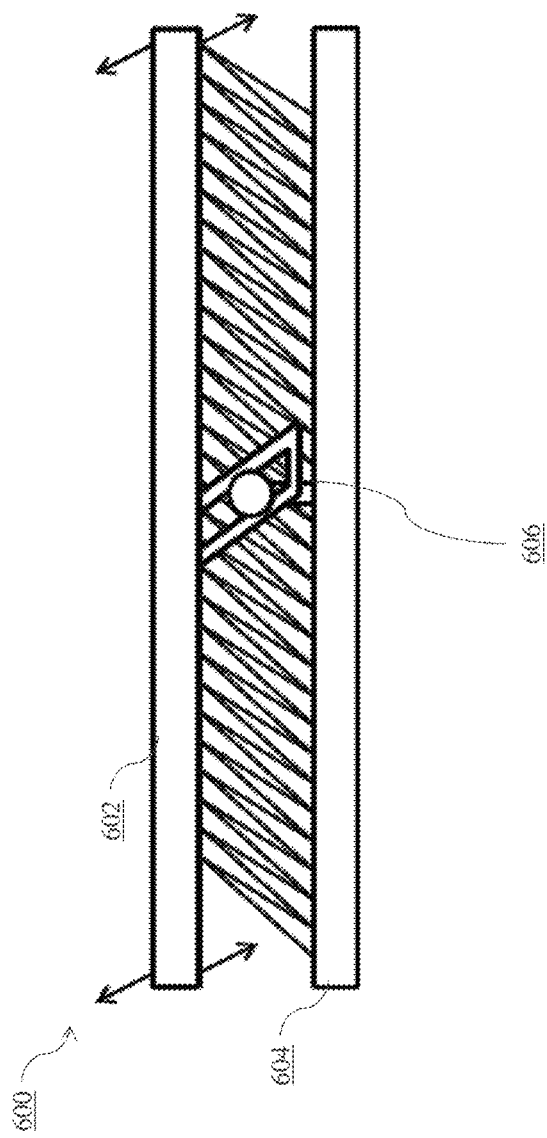
FIG. 6 shows a side view of a shock absorption device having a movement guide.
Figure 7:
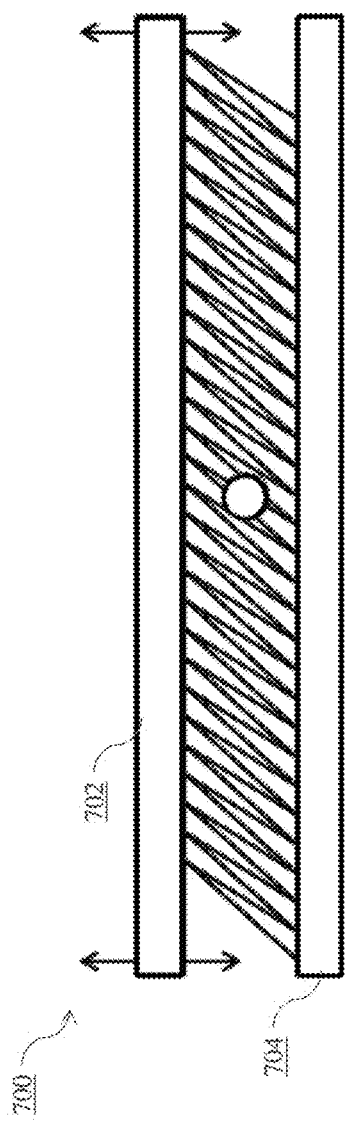
FIG. 7 shows a side view of a shock absorption device having no movement guide.

FIG. 6 shows an embodiment 600 where the first plate 602 and the second plate 604 are coupled to one another by a movement guide 606 comprising a pin and a slot. Movement of the first plate 602 is restricted to movement along the direction indicated by the arrows drawn onto FIG. 6. In some aspects, the members are not directly coupled to one another. FIG. 7 shows an embodiment 700 where the two members 702 and 704 are free to move toward each other without restriction from a movement guide. This can be preferable in situations where freedom of movement between the two members 702 and 704 is important.

Figure 8:
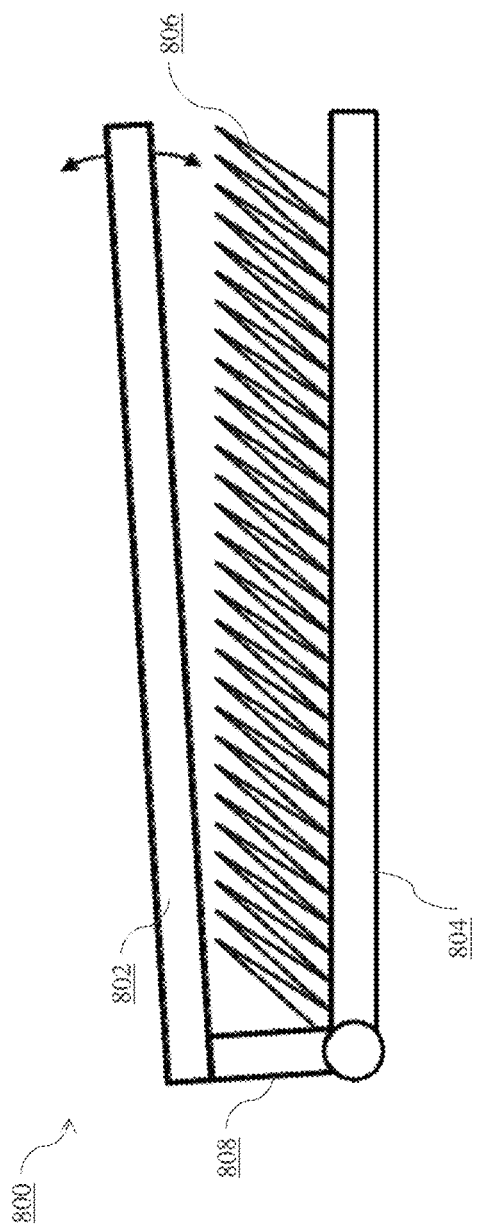
FIG. 8 shows a side view of a shock absorption device where the members are hingedly coupled with an offset.
Figure 9:
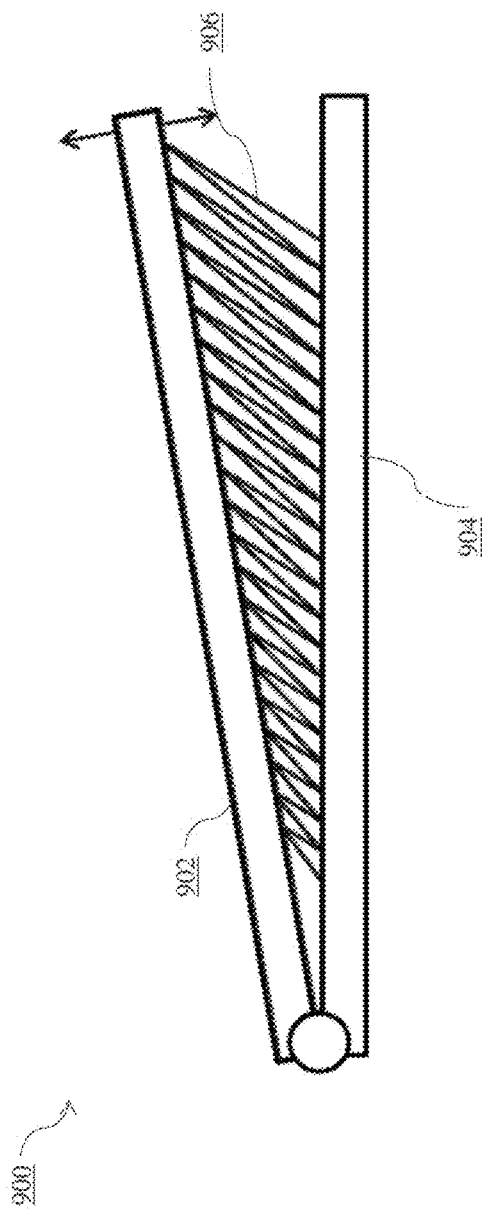
FIG. 9 shows a side view of a shock absorption device where the members are hingedly coupled without an offset and where the canted coil spring is formed as a wedge.

The members can be restricted in other ways than the movement guide 606 shown in FIG. 6. In some embodiments, such as the embodiment 800 shown in FIG. 8, the members 802 and 804 are hingedly coupled and offset 808 such that they are substantially parallel when they first come into contact with the canted coil spring 806, while in other embodiments they are substantially parallel when the members 802 and 804 have fully compressed the canted coil spring 806. It is also sometimes preferable to have the members 902 and 904 hingedly coupled without the offset as shown in FIG. 9. In such an embodiment 900, it is preferable for the canted coil spring 906 to similarly be wedge-shaped (e.g., in an uncompressed state as drawn).

Figure 10:
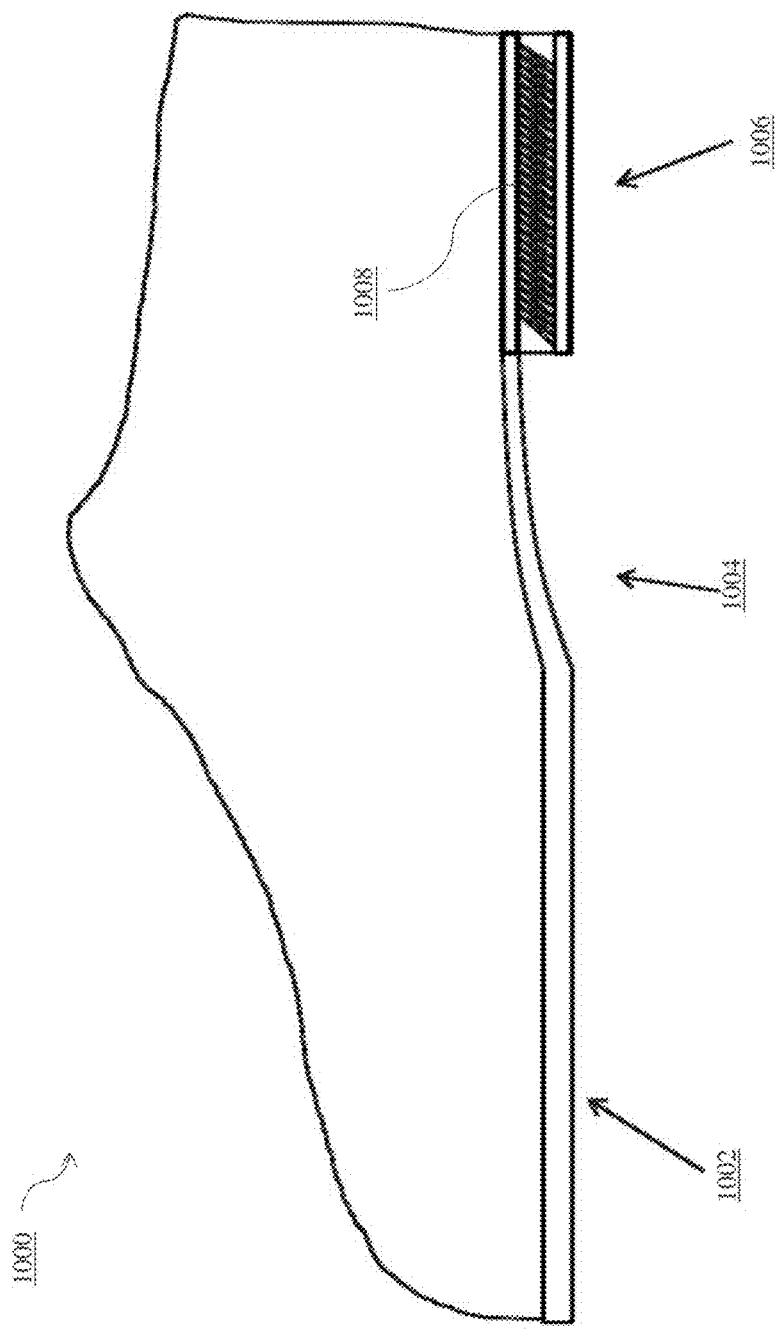
FIG. 10 is a shoe having a shock absorption device in the heel portion.
Figure 11:
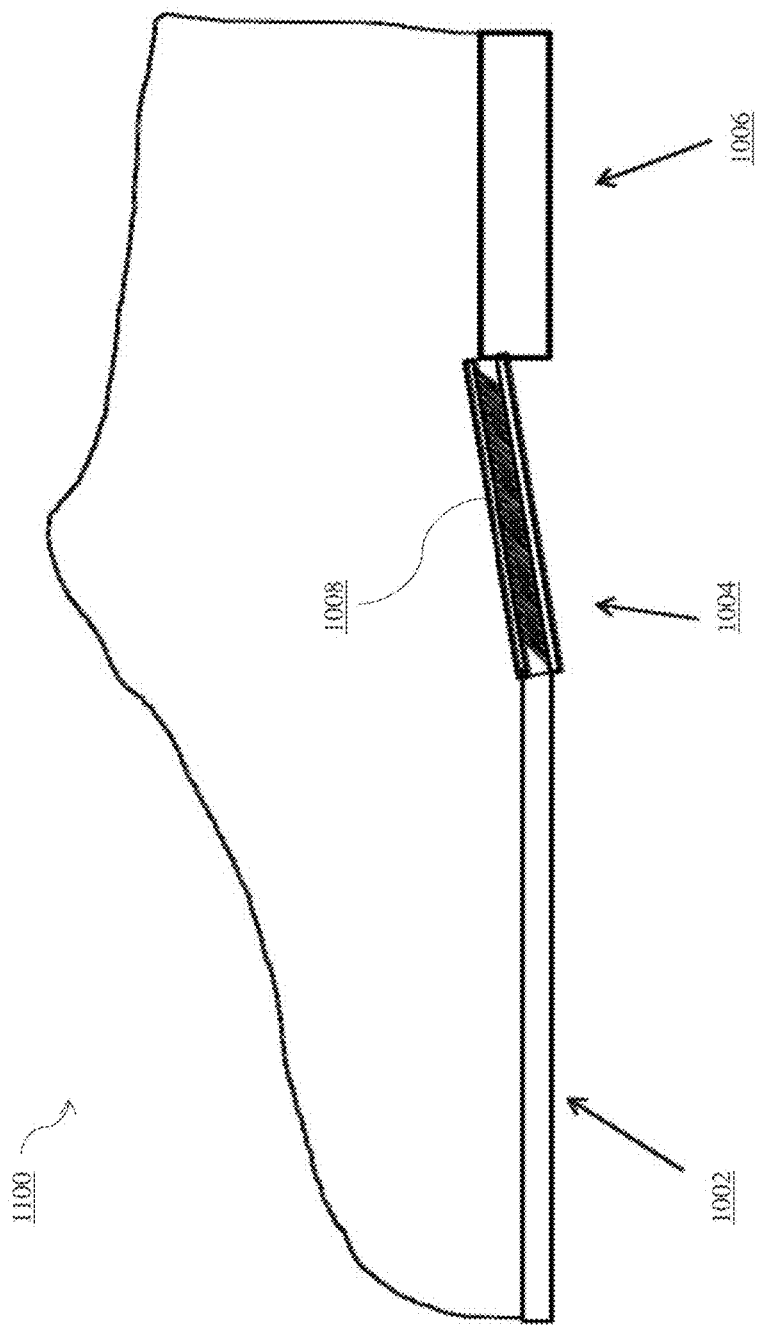
FIG. 11 is a shoe having a shock absorption device in the mid-foot portion.
Figure 12:
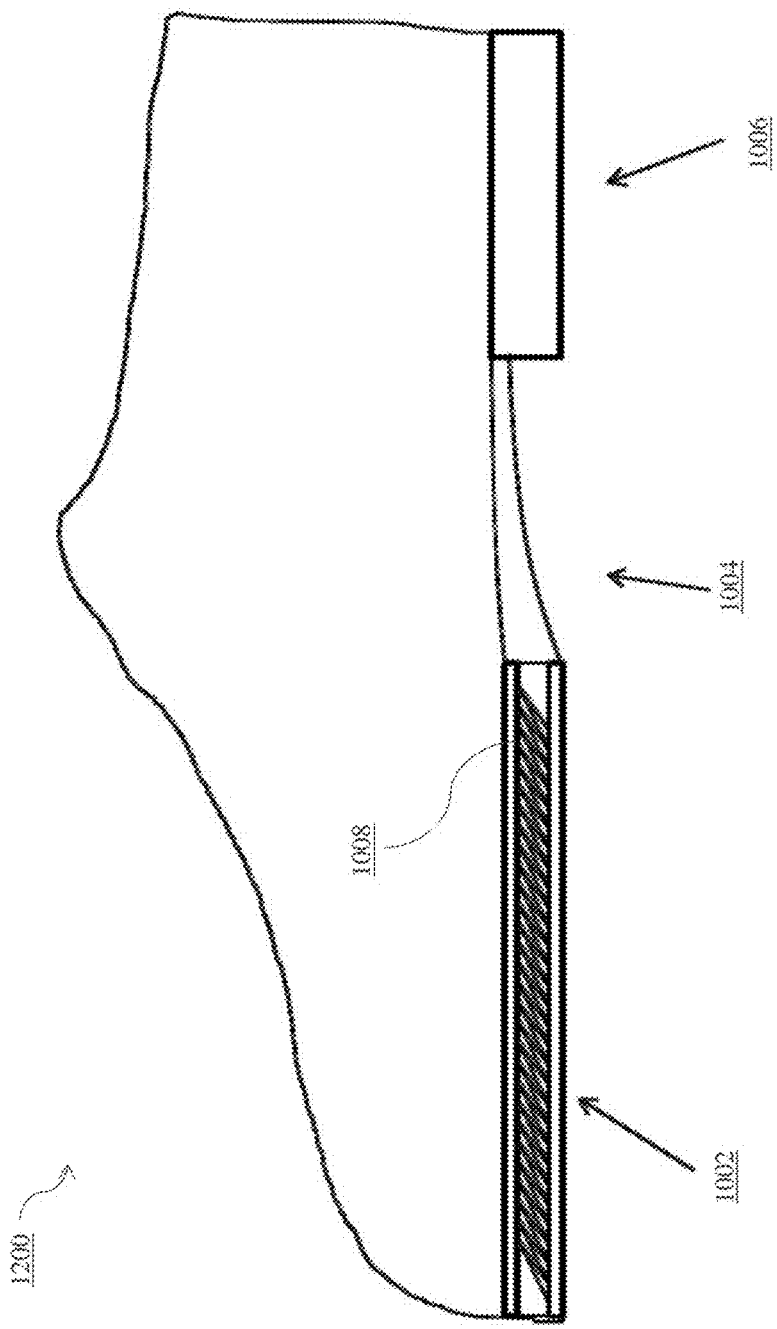
FIG. 12 is a shoe having a shock absorption device in the forefoot portion.

One example of a real-world use for the shock absorption devices described in this application is in a shoe. Shoes 1000, 1100, and 1200, as seen in FIGS. 10-12, can be described as having a forefoot portion 1002, a mid-foot portion 1004, and a heel portion 1006. The shock absorbing device 1008 can be disposed in the heel portion (FIG. 10), the mid-foot portion (FIG. 11), or the forefoot portion (FIG. 12). Any of the shock absorption devices described in this application can be used in any portion of the shoe. In some embodiments, the shock absorption device is removable and replaceable. For example, FIGS. 10-12 show a shoe having embodiments of a shock absorbing device similar to the one depicted in FIG. 7. The shock absorbing devices shown in FIGS. 10-12 could be swapped out for, as an example, any of the devices depicted in FIGS. 6-9 without damaging the shoe.

The principle behind enabling swapping of shock absorption devices is to enable a user to select a shock absorption device that exhibits specific desired qualities. For example, different gauge wire can be used to form the canted coil springs to affect how difficult it is to compress the spring.

Figure 13:
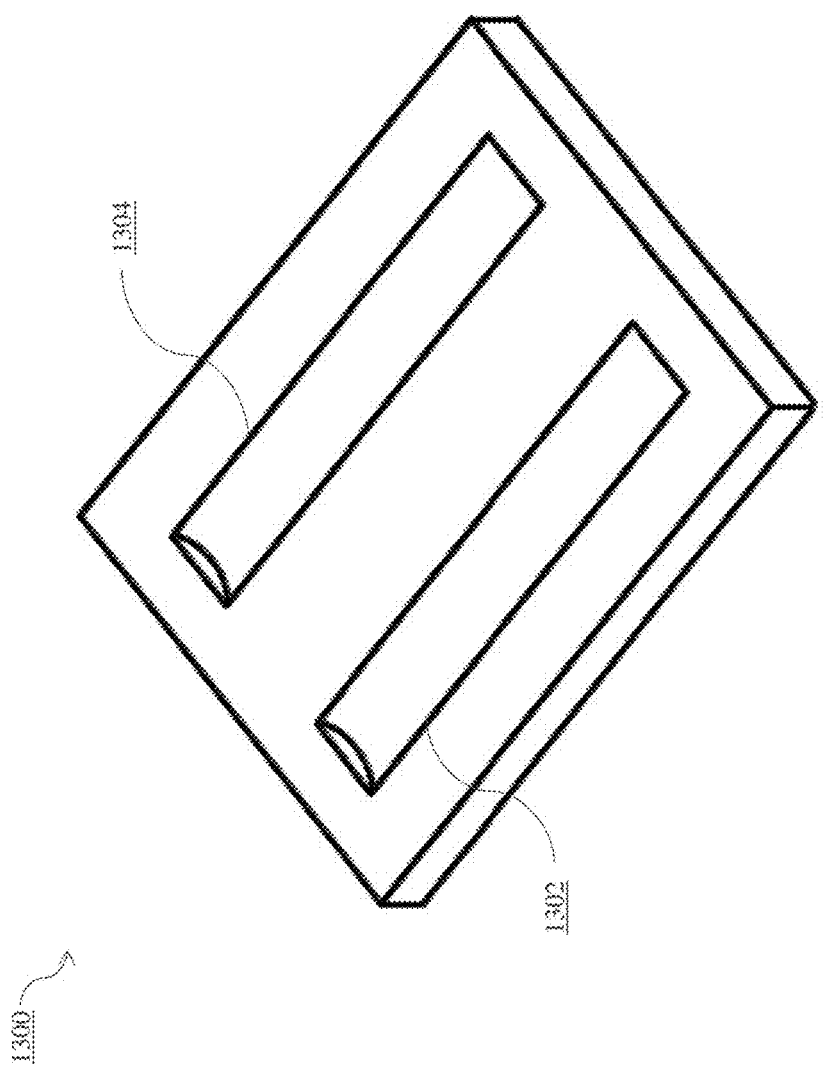
FIG. 13 shows a member having channels to nest two linear canted coil springs.

Regardless of the embodiment, the canted coil springs of the shock absorption device can be nested within one or more channel. FIG. 13 shows a member 1300 having two channels 1302 and 1304 disposed on a surface. Two canted coil springs can fit within the channels 1302 and 1304.

Various applications of the present inventive subject matter are possible. For example, shock absorption devices can be used in orthopedic devices to encourage or resist different types of bone motion during a person's gait. Contemplated shock absorption devices can also be used in running shoes to absorb shock while minimizing the amount of bounce back.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A shock absorption device for a shoe comprising:
   a first member movably coupled with a second member; and
   a first linear canted coil spring disposed between the first member and the second member;
   wherein the first linear canted coil spring has a first longitudinal axis and comprises a first plurality of coils that are canted with respect to the longitudinal axis;
   wherein the first canted coil spring has a first axis of compressibility that is oriented such that the first and second members cause compression along the first axis of compressibility upon movement of the first member toward the second member; and
   wherein the plurality of canted coils of the first linear canted coil spring cause the first member to move (i) in a first lateral direction as the first member moves toward the second member during compression of the first linear canted coil spring, and (ii) in a second lateral direction opposite the first lateral direction as the first member moves away from the second member during decompression of the first linear canted coil spring.

2. The shock absorption device of claim 1, further comprising:
   a second linear canted coil spring comprising a second plurality of canted coils and disposed between the first member and the second member; and
   wherein the second canted coil spring has a second axis of compressibility and is oriented such that the first and second members cause compression along the second axis of compressibility upon movement of the first member toward the second member.

3. The shock absorption device of claim 2, wherein the first linear canted coil spring and the second linear canted coil spring are positioned parallel to one another between the first member and the second member.

4. The shock absorption device of claim 2, wherein the first and the second linear canted coil springs are oriented between the first member and the second member such that the first and second plurality of coils are canted in the same direction.

5. The shock absorption device of claim 1, wherein the shock absorption device is disposed in a heel of the shoe.

6. The shock absorption device of claim 5, wherein the first lateral direction is towards a rear of the shoe and the second lateral direction is towards a front of the shoe.

7. The shock absorption device of claim 1, further comprising a movement guide that prevents the first member from moving in a third lateral direction that is perpendicular to the first and second lateral directions.

8. The shock absorption device of claim 7, wherein the movement guide restricts the first and second members from decoupling.

9. A shoe comprising:
   a heel portion, a mid-foot portion, and forefoot portion;
   a first shock absorption device disposed in at least one of the heel portion, the mid-foot portion, and the forefoot portion;
   wherein the shock absorption device comprises a first linear canted coil spring disposed between a first member and a second member; and
   wherein the first linear canted coil spring is disposed between the first member and the second member such that the first member and the second member cause the first linear canted coil spring to compress along its minor axis upon movement of the first member toward the second member; and
   wherein the minor axis is oriented relative to the first member and second member such that the first member moves in a first lateral direction upon decompression of the first linear canted coil spring; and
   wherein the first lateral direction is towards the forefoot portion.

10. The shoe of claim 9, wherein the shock absorption device further comprises:
    a second linear canted coil spring disposed between the first and second members; and
    wherein the second linear canted coil spring is oriented symmetrically relative to the first canted coil spring.

11. The shoe of claim 9, wherein at least one of the first and second members comprises a channel for the first linear canted coil spring to rest in.

12. The shoe of claim 9, wherein the first shock absorption device is removably coupled with the shoe.

13. The shoe of claim 12, wherein the first shock absorption device is interchangeable with a second shock absorption device having different spring properties.

14. The shoe of claim 10, wherein the first linear canted coil spring and the second linear canted coil spring are positioned parallel to one another between the first member and the second member.

15. The shoe of claim 10, wherein the first and the second canted coil springs (a) comprise first and second pluralities of coils, respectively, and (b) are oriented between the first member and the second member such that the first plurality of coils and the second plurality of coils are canted in the same direction.

16. The shoe of claim 10, wherein the first and the second linear canted coil springs (a) comprise first and second pluralities of coils, respectively, and (b) are oriented between the first member and the second member such that the first plurality of coils and the second plurality of coils are canted in opposite directions.

17. A device for storing and releasing kinetic energy in a shoe comprising:
   a first member movably coupled with a second member;
   a first circular canted coil spring disposed between the first member and second member;
   a second circular canted coil spring disposed between the first member and second member and oriented concentrically to the first circular canted coil spring; and
   wherein the first member and second member are substantially parallel to one another;
   wherein each of the first and second circular canted coil springs has an axis of compressibility oriented in a normal direction to the first and second members such that (i) the first and second members move towards one another when the first and second circular canted coil springs are compressed and (ii) the first and second members move away from one another when the first and second circular canted coil springs are depressed.

18. The device of claim 17, wherein the first circular canted coil spring is canted in a first circular direction.

19. The device of claim 18, wherein the second circular canted coil spring is canted in a second direction that is opposite the first direction.

20. The device of claim 18, wherein the second circular canted coil spring is canted in the first direction.

21. The device of claim 18, wherein the device is at least partially disposed within a heel of the shoe.

* * * * *

UNITED STATES PATENT AND TRADEMARK OFFICE
CERTIFICATE OF CORRECTION

PATENT NO. : 10,487,899 B2
APPLICATION NO. : 15/046386
DATED : November 26, 2019
INVENTOR(S) : Carl Nelson Page 1 of 1

It is certified that error appears in the above-identified patent and that said Letters Patent is hereby corrected as shown below:

In the Claims

At Column 6, Line 47, change "to the first canted coil spring." to --to the first linear canted coil spring.--

At Column 6, Lines 60 and 61, change "wherein the first and the second canted coil springs" to --wherein the first and the second linear canted coil springs--

Signed and Sealed this
Twentieth Day of October, 2020

Andrei Iancu
*Director of the United States Patent and Trademark Office*